(12) United States Patent
Lim et al.

(10) Patent No.: US 8,713,403 B2
(45) Date of Patent: Apr. 29, 2014

(54) METHOD AND APPARATUS FOR MAP TRANSMISSION IN WIRELESS COMMUNICATION SYSTEM

(75) Inventors: Chi-Woo Lim, Suwon-si (KR); Hyun-Kyu Yu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 241 days.

(21) Appl. No.: 13/218,856

(22) Filed: Aug. 26, 2011

(65) Prior Publication Data
US 2012/0066572 A1    Mar. 15, 2012

(30) Foreign Application Priority Data

Sep. 12, 2010   (KR) .......................... 10-2010-008918

(51) Int. Cl.
*H03M 13/00*     (2006.01)

(52) U.S. Cl.
USPC .......................................................... 714/758

(58) Field of Classification Search
USPC .................... 714/739, 746, 758, 762, 788
See application file for complete search history.

(56) References Cited

U.S. PATENT DOCUMENTS

2004/0223472 A1* 11/2004 Sankaran et al. ............. 370/335

* cited by examiner

*Primary Examiner* — Shelly A Chase
(74) *Attorney, Agent, or Firm* — Jefferson IP Law, LLP

(57) ABSTRACT

An operating method of a base station for transmitting MAP information in a wireless communication system includes determining a seed value for randomizing MAP information bits, generating a Media Access Control (MAC) control message including the seed value and a Station IDentifier (STID), and transmitting the MAC control message to a mobile station. Hence, the assignment A-MAP IE can be transmitted more safely.

26 Claims, 4 Drawing Sheets

METHOD AND APPARATUS FOR MAP TRANSMISSION IN WIRELESS COMMUNICATION SYSTEM

PRIORITY

This application claims the benefit under 35 U.S.C. §119 (a) of a Korean patent application filed in the Korean Intellectual Property Office on Sep. 12, 2010, and assigned Serial No. 10-2010-0089180, the entire disclosure of which is hereby incorporated by reference.

BACKGROUND OF THE INVENTION

1. Field of the Invention

The present invention relates to MAP transmission in a wireless communication system. More particularly, the present invention relates to a method and an apparatus for transmitting MAP information through randomization and Cyclic Redundancy Check (CRC) masking in a broadband wireless communication system.

2. Description of the Related Art

In an Institute of Electrical and Electronics Engineers (IEEE) 802.16m communication system, a base station transmits a resource to be allocated or used by each mobile station and transmits information used for data transmission and reception through an assignment Advanced-MAP (A-MAP) Information Element (IE) in downlink and uplink.

The assignment A-MAP IE includes information used for operating a mobile station. Using a predetermined seed value of randomization and a Cyclic Redundancy Check (CRC) mask value, the base station transmits the assignment A-MAP IE to the mobile station. Each mobile station identifies the given assignment A-MAP IE using the predetermined randomization seed value and the CRC mask value. The seed value of the randomization uses 15 bits excluding a 1-bit masking prefix in the 16-bit CRC mask value. When the predetermined randomization seed value and CRC mask value are determined, a STation IDentifier (STID) value of the mobile station is a critical value that is to be secured.

However, security is vulnerable to a malicious mobile station which obtains the assignment A-MAP IE information assigned to another mobile station using a STID other than its own STID. That is, since the STID includes 12 bits and has only 40,912,266 different values, anyone may acquire the STID of the other mobile station and easily obtain the assignment A-MAP IE information assigned to the other mobile station.

Thus, the data transmission may be vulnerable to a security breach when the malicious mobile station obtains the allocation information of data of the other user transmitted in the downlink through the assignment A-MAP IE of the other user terminal and then receives the data at the malicious mobile station. To address this problem, the present invention provides a method and an apparatus for more safely transmitting the assignment A-MAP IE.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for transmitting MAP information in a broadband wireless communication system.

Another aspect of the present invention is to provide a method and an apparatus for more safely transmitting an assignment Advanced-MAP (A-MAP) Information Element (IE) using randomization and a Cyclic Redundancy Check (CRC) mask in a broadband wireless communication system.

Yet another aspect of the present invention is to provide a method and an apparatus for determining a seed value for randomization and the CRC mask in a broadband wireless communication system.

According to an aspect of the present invention, an operating method of a base station for transmitting MAP information in a wireless communication system is provided. The method includes determining a seed value for randomizing MAP information bits, generating a Media Access Control (MAC) control message including the seed value and a Station IDentifier (STID), and transmitting the MAC control message to a mobile station. The MAC control message may be one of an Advanced Air Interface (AAI)-RaNGing (RNG)-ReSPonse (RSP) message sent from the base station in response to an AAI-RNG-REQuest (REQ) message received from the mobile station in a network entry, an AAI-REGistration (REG)-RSP message sent from the base station in response to an AAI-REG-REQ message received from the mobile station to register the mobile station by negotiating general AMS capabilities in the network entry, and an AAI-HandOver (HO)-CoMmanD (CMD) message sent from the base station to initiate a handover procedure or in response to an AAI-HO-REQ message received from the mobile station.

According to another aspect of the present invention, an operating method of a mobile station for receiving MAP information in a wireless communication system is provided. The method includes receiving from a base station a MAC control message including a seed value for randomizing MAP information bits and an STID in a network entry procedure, extracting the seed value and the STID from the MAC control message, and decoding the MAP information bits using the seed value and the STID. The MAC control message may be one of an AAI-RNG-RSP message sent from the base station in response to an AAI-RNG-REQ message received from the mobile station in a network entry, an AAI-REG-RSP message sent from the base station in response to an AAI-REG-REQ message received from the mobile station to register the mobile station by negotiating general AMS capabilities in the network entry, and an AAI-HO-CMD message sent from the base station to initiate a handover procedure or in response to an AAI-HO-REQ message received from the mobile station.

According to yet another aspect of the present invention, an apparatus of a base station for transmitting MAP information in a wireless communication system is provided. The apparatus includes a controller for determining a seed value for randomizing MAP information bits, and generating a MAC control message including the seed value and an STID, and a transmitter for sending the MAC control message to a mobile station. The MAC control message may be one of an AAI-RNG-RSP message sent from the base station in response to an AAI-RNG-REQ message received from the mobile station in a network entry, an AAI-REG-RSP message sent from the base station in response to an AAI-REG-REQ message received from the mobile station to register the mobile station by negotiating general AMS capabilities in the network entry, and an AAI-HO-CMD message sent from the base station to initiate a handover procedure or in response to an AAI-HO-REQ message received from the mobile station.

According to still another aspect of the present invention, an apparatus of a mobile station for receiving MAP information in a wireless communication system is provided. The apparatus includes a receiver for receiving a Radio Frequency (RF) signal from a base station, the RF signal including a MAC control message including a seed value for randomizing MAP information bits and an STID in a network entry procedure, and a decoder for extracting the seed value and the STID from the MAC control message, and for decoding the MAP information bits based on the seed value and the STID. The MAC control message may be one of an AAI-RNG-RSP message sent from the base station in response to an AAI-RNG-REQ message received from the mobile station in a network entry, an AAI-REG-RSP message sent from the base station in response to an AAI-REG-REQ message received from the mobile station to register the mobile station by negotiating general AMS capabilities in the network entry, and an AAI-HO-CMD message sent from the base station to initiate a handover procedure or in response to an AAI-HO-REQ message received from the mobile station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
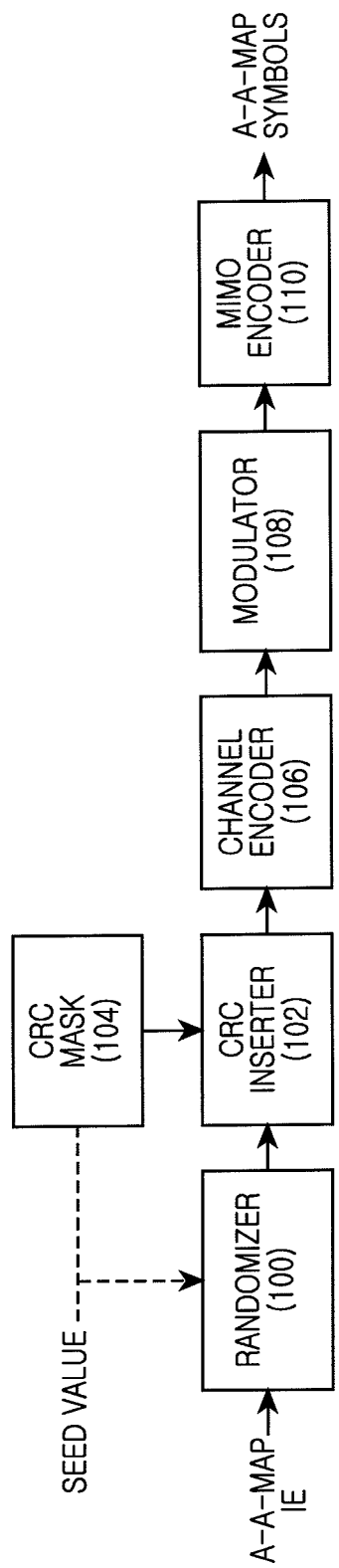
FIG. 1 is a block diagram of a transmitter for transmitting MAP information in a broadband wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for transmitting MAP information in a wireless communication system. In particular, exemplary embodiments of the present invention provide a method and an apparatus for transmitting an assignment Advanced-MAP (A-MAP) Information Element (IE) more safely using randomization and a Cyclic Redundancy Check (CRC) mask.

Hereinafter, an Institute of Electrical and Electronics Engineers (IEEE) 802.16m system is explained by way of example. However, the present invention is not limited to the IEEE 802.16m system and other suitable wireless communication systems may incorporate the present invention.

According to the IEEE 802.16m standard, the assignment A-MAP IE is transmitted as described below.

The assignment A-MAP IE, which is 40 bits, is randomized, and a 16-bit masked CRC is inserted into the randomized MAP information bits. Next, the randomized MAP information bits are channel-encoded through a Tail Biting Convolutional Codes (TBCC) encoder, modulated using Quadrature Phase Shift Keying (QPSK), and then transmitted.

A seed value for the randomization uses 15 bits excluding a 1-bit masking prefix in the CRC mask. The 16-bit CRC is generated through the masking with the CRC mask.

That is, based on a STation IDentifier (STID) corresponding to a mobile station, only the corresponding mobile station can receive the assignment A-MAP IE through the randomization and the CRC masking. However, a certain malicious mobile station can obtain the information by receiving the assignment A-MAP IE using every STID. The STID is 12 bits in size and can be any of 4,096 IDentifiers (IDs) in total. Eventually, with enough time transpiring, every A-MAP IE can be received by the certain malicious mobile station that improperly uses the STID.

Exemplary embodiments of the present invention assign a specific value (or the seed value) other than the STID to the mobile station and enable a more safe assignment A-MAP IE transmission using this value. The base station sends a new value, rather than the STID, to the mobile station so that the new value is used as the seed value of the randomization, thus achieving a more safe assignment A-MAP IE transmission.

FIG. 1 is a block diagram of a transmitter for transmitting MAP in a broadband wireless communication system according to an exemplary embodiment of the present invention.

Referring to FIG. 1, the transmitter includes a randomizer 100, a CRC mask 104, a CRC inserter 102, a channel encoder 106, a modulator 108, and a Multiple Input Multiple Output (MIMO) encoder 110.

The randomizer 100 randomizes corresponding MAP information using a sequence generated by a Pseudo-Random Binary Sequence (PRBS) generator (not shown). That is, the 40-bits of information contained in an Assignment A-MAP (A-A-MAP) IE are masked by the sequence generated by the PRBS generator. In an XOR operation with the A-A-MAP IE, the mask randomizes the A-A-MAP IE. When the seed is used to initialize the PRBS generator, the mask also conceals the contents of the A-A-MAP IE from users not intended to view the contents of the A-A-MAP IE.

The randomization is initialized by an initial vector. The 15-bit initial vector of the PRBS generator is the seed value transmitted to a Mobile Station (MS) in the same Media Access Control (MAC) control message as the STID value used as the 16-bit CRC Mask Masking Code. Otherwise, the 15-bit initial vector of the PRBS generator shall be the same as the 16-bit A-A-MAP CRC mask, as shown in a Table 4 below.

For example, the seed value is carried by a MAC control message so that the base station allocates the STID to the mobile station. The MAC control message carrying the seed value may be a variety of MAC messages, such as an Advanced Air Interface (AAI)-RaNGing (RNG)-ReSPonse (RSP) message, an AAI-REGistration (REG)-RSP message, an AAI-HandOver (HO)-CoMmanD (CMD) message, and other similar MAC messages. In other words, when the mobile station enters the network, the mobile station transmits an AAI-RNG-REQ message to the base station, and the base station sends the AAI-RNG-RSP message including the seed value to the mobile station in reply to the AAI-RNG-REQ message received from the mobile station. During registration through negotiating general Advanced Mobile Station (AMS) capabilities in the network entry, the mobile station sends an AAI-REG-REQ message to the base station and the base station sends an AAI-REG-RSP message, including the seed value, to the mobile station in reply to the AAI-REG-REQ message received from the mobile station. The base station transmits the AAI-HO-CMD message, including the seed value, to the mobile station to initiate a handover procedure. Alternatively the base station transmits the AAI-HO-CMD message including the seed value to the mobile station in response to an AAI-HO-REQ message received from the mobile station.

The AAI-RNG-RSP message, the AAI-REG-RSP message, and the AAI-HO-CMD message are as shown in Table 1, Table 2, and Table 3.

TABLE 1

| Attributes/ Array of attributes | Size (bit) | Value/Note | Conditions |
| --- | --- | --- | --- |
| ... | ... | ... | ... |
| Temporary STID | 12 | Used for AMS identification until STID is assigned to the AMS during registration procedure | It shall be included in the AAI-RNG-RSP message in response to the AAI-RNG-REQ message, which is not Cipher Message Authentication Code (CMAC) protected, when the AMS is not assigned its STID/Device Identification (DID) yet. |
| Seed Value | 12 or 15 | This parameter shall be used at the Target-Advanced Base Station (T-ABS) to initiate the PRBS generator used to scramble the 40-bit A-A-MAP IE when the STID is used to mask the CRC. | Present only when Temporary STID is present |
| AMSID*/MAC address | 48 | A required parameter when the AMS confirms if the AAI-RNG-RSP is a response to the AAI-RNG-REQ message which the AMS sent. In the legacy network mode, the actual MAC address of the AMS is used instead. | It shall e included in the AAI-RNG-RSP message in response to the AAI-RNG-REQ message, which is not CMAC protected, when the AMS is not assigned its STID yet. |
| ... | ... | ... | ... |

TABLE 2

| Attributes/ Array of attributes | Size (bit) | Value/Note | Conditions |
| --- | --- | --- | --- |
| STID | 12 | AMS identifier which the Advanced Base Station (ABS) assigns to the AMS in place of the temporary STID which has been transferred by AAI-RNG-RSP message. | Present if needed |
| Seed Value | 12 or 15 | The value of this parameter is the seed used at the ABS to initiate the PRBS generator used to scramble the 40-bit A-A-MAP IE when the value of the STID included in this message is used as the CRC Mask Masking Code. | |
| CRID | 72 | AMS identifier which the AMS has been assigned for coverage loss or Deregistration with Content Retention (DCR) mode. | |
| ... | ... | ... | ... |
| AMS initiated aGP Service Adaptation Capability | 1 | AMS initiated adaptive Grant and Polling (aGP) Service Adaptation Capability: | Present if needed |

TABLE 3

| Attributes/ Array of attributes | Size (bit) | Value/Note | Conditions |
| --- | --- | --- | --- |
| Mode | 2 | 0b00: HO command; 0b01: Zone switch command from AMS support Zone (MZone) to a Legacy Zone (LZone); 0b10: AMS HO request rejected (ABS in list unavailable). In this case, AAI-HO-CMD message shall not include any T-ABS.N/A | N/A |
| ... | ... | ... | ... |
| Ranging initiation deadline | 8 | An AMS shall send the AAI-RNG-REQ message during HO until Ranging initiation deadline. | |

TABLE 3-continued

| Attributes/Array of attributes | Size (bit) | Value/Note | Conditions |
|---|---|---|---|
| Seed Value | 12 or 15 | Used to seed value for randomization to generate A-MAP IE. | |
| Pre-assigned STID | 12 or 15 | STID assigned to the AMS by the T-ABS | |
| ... } | ... | ... | ... |

In various implementations, the seed value may be a time-varying value rather than a constant value. That is, after an initial value is signaled, the value may be altered based on the time by a separate arrangement. This is required for a more safe assignment A-MAP IE transmission. Notably, the mobile station and the base station should be synchronized mutually by sharing a same time-varying function to change or later the initial value.

The CRC mask 104 masks the 16-bit CRC with the CRC mask and provides the masked CRC to the CRC inserter 102. That is, the CRC mask 104 performs an XOR operation on the 16-bit CRC and the 16-bit CRC mask value. Herein, descriptions of the CRC mask are shown in Table 4.

| Masking Prefix (1 bit Most Significant Bit (MSB)) | Remaining 15 bit Least Significant Bits (LSBs) | |
|---|---|---|
| | Type Indicator | Masking Code |
| 0b0 | 0b000 | 12 bit STID |
| | 0b001 | refer to <table 5> |
| | 0b010 | 12 bit Masking Code (0xFFF in Hex) |
| 0b1 | | 15 bit Random Access-ID (RA-ID): The RA-ID is derived from the AMS' random access attributes (i.e., superframe number (LSB 5 bits), frame_index (2 bits), preamble code index for ranging or BR (6 bits) and opportunity index for ranging or a Bandwidth Request (BR) (2 bits)) as defined below: RA-ID = (LSB 5 bits of superframe number | frame_index preamble_code_index | opportunity_index) |

The CRC mask includes a 1-bit masking prefix and 15-bit Least Significant Bits (LSBs). When the masking prefix is "0", the LSB 15 bits include a 3-bit type indicator and a 12-bit masking code. When the masking prefix is "1", a 15-bit RAID is used. The type indicator indicates whether the mask code is "STID", "0xFFF", or the making code of Table 5.

TABLE 5

| Decimal Value | Description |
|---|---|
| 0 | Used to mask Broadcast Assignment A-MAP IE |
| 1 | Used to mask BR-ACK A-MAP IE |
| 2-128 | Used to mask Group Resource Allocation A-MAP IE (group ID) |

Meanwhile, the STID in the masking code can be replaced by the 12-bit seed value sent from the base station to the mobile station through the message.

The CRC inserter 102 adds the masked CRC value to a tail of the randomized MAP information bits and outputs the bits to the channel encoder 106.

The channel encoder 106 encodes the bits output from the CRC inserters 102 and outputs the encoded bits to the modulator 108. The channel encoding scheme can employ Tail-Biting Convolutional Codes (TBCC) or Convolutional Turbo Codes (CTC), or other suitable encoding schemes.

The modulator 108 modulates the channel-encoded information bits using the corresponding modulation scheme and provides the modulated bits to the MIMO encoder 110. The modulation scheme can employ Quadrature Phase Shift Keying (QPSK), 8 Quadrature Amplitude Modulation (QAM), 16QAM, 64QAM, and the like. The MIMO encoder 110 transmits modulation symbols by mapping to corresponding antennas.

Figure 2:
FIG. 2 is a block diagram of a receiver for receiving MAP information in a broadband wireless communication system according to an exemplary embodiment of the present invention.

FIG. 2 is a block diagram of a receiver for receiving the MAP in a broadband wireless communication system according to an exemplary embodiment of the present invention.

Referring to FIG. 2, the receiver includes a MIMO detector 200, a demodulator 202, a channel decoder 204, a CRC checker 206, and a derandomizer 208.

The MIMO detector 200 detects an intended signal from a signal received through multiple antennas by using a Minimum Mean Square Error (MMSE) or Maximum Likelihood (ML) operation.

The demodulator 202 demodulates the detected signal using a demodulation scheme corresponding to a modulation scheme of the transmitter. The channel decoder 204 obtains information by decoding the demodulated signal using a decoding scheme corresponding to an encoding scheme of the transmitter.

The CRC checker 206 restores a masked CRC to the original CRC by using a CRC mask and checks the CRC with reference to the restored CRC mask.

The derandomizer 208 restores the MAP information by derandomizing the information using a seed value received from the transmitter through a corresponding message.

Figure 3:
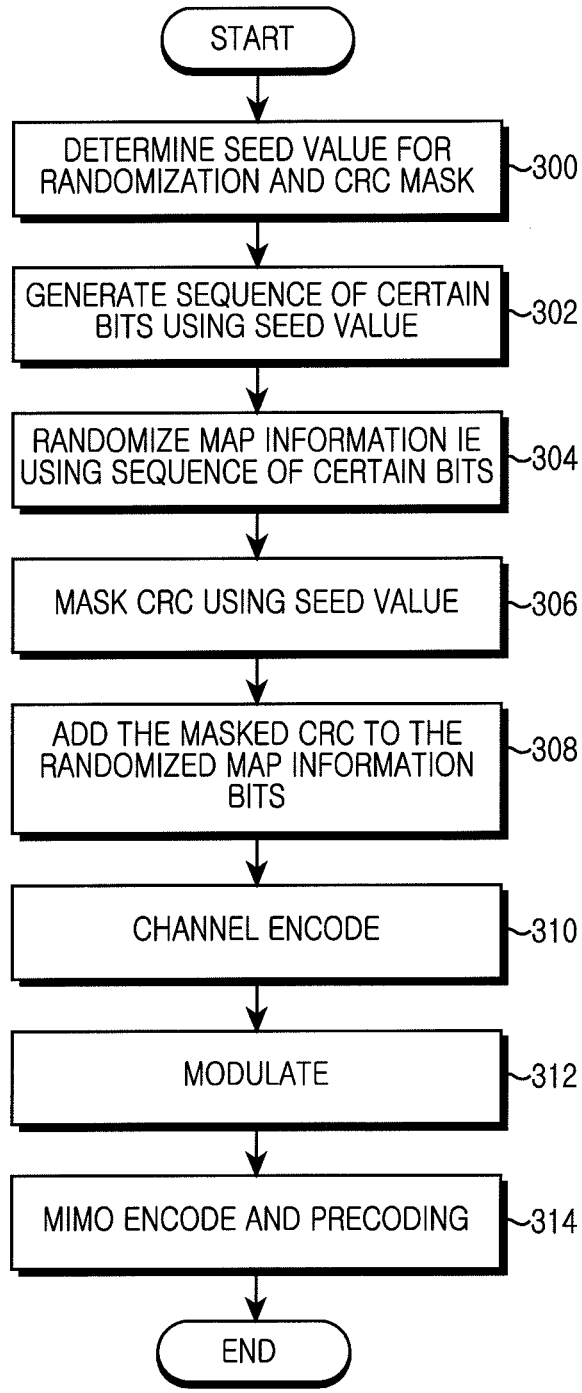
FIG. 3 is a flowchart of operations of the transmitter for transmitting MAP information in a broadband wireless communication system according to an exemplary embodiment of the present invention.

FIG. 3 is a flowchart of operations of the transmitter for transmitting the MAP in the broadband wireless communication system according to an exemplary embodiment of the present invention.

Referring to FIG. 3, in a network entry procedure, a transmitter, such as a base station, sends a seed value for a randomization to a receiver, such as a mobile station, together with an STID through a signaling message. The transmitter determines the seed value to be transmitted in step 300. For example, the seed value for the randomization is sent from the base station to the mobile station through at least one of the REG message, the RNG message, and the HO message. However, the present invention is not limited thereto, and other messages may be used to transmit the seed value from the base station to the mobile station.

The seed value can be a time-varying value rather than a constant value. That is, after an initial value of the seed value is transmitted, the initial value may be altered by a separate arrangement according to a time. The time based alteration of the initial value provides for a more safe assignment A-MAP IE transmission. However, in order to alter the initial value according to the time, the mobile station and the base station should be synchronized mutually by sharing a same time-varying function.

The seed value includes 12 bits or 15 bits. The 12-bit seed value is used in place of the STID of the CRC mask, and the 15-bit seed value is used in place of the CRC mask value, and as noted above, the seed value for randomization and the CRC mask is determined in step 300.

Next, the transmitter generates a sequence of certain bits using the seed value in step 302 and randomizes the MAP information bits to transmit in step 304. In step 306, the transmitter masks the CRC using the seed value. That is, the transmitter performs an XOR operation on the 16-bit CRC value and the 16-bit CRC mask. Herein, the CRC mask can be determined as the STID or the seed value of step 300.

In step 308, the transmitter adds the masked CRC value to the randomized MAP information bits with the 15-bit seed value or the 15-bit CRC mask. The transmitter then performs the channel encoding in step 310, modulates the channel-encoded data in step 312, and MIMO-encodes and precodes the modulation symbols in step 314.

Figure 4:
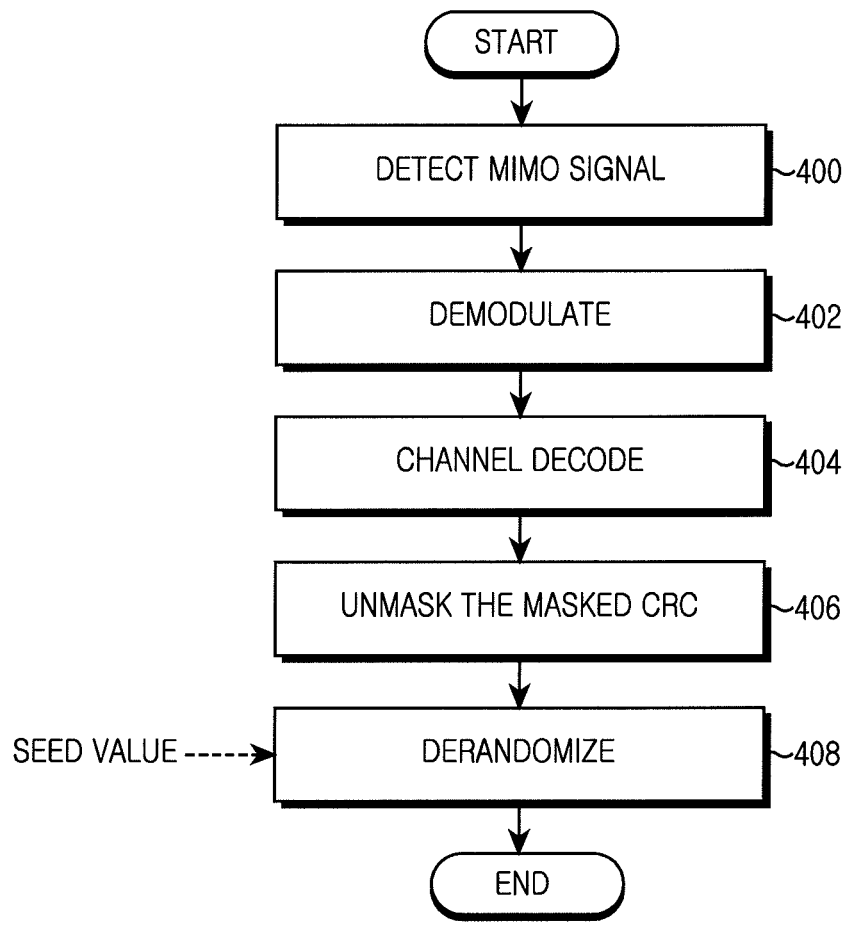
FIG. 4 is a flowchart of operations of the receiver for receiving MAP information in a broadband wireless communication system according to an exemplary embodiment of the present invention.

FIG. 4 is a flowchart of operations of the receiver for receiving the MAP in the broadband wireless communication system according to an exemplary embodiment of the present invention.

Referring to FIG. 4, the receiver detects an intended MIMO signal from the signal received over multiple antennas in step 400. The receiver demodulates the intended signal in step 402 and channel-decodes the demodulated signal in step 404.

In step 406, the receiver restores or unmasks a masked CRC using a CRC mask value. That is, the receiver determines an unmasked CRC value from the masked CRC. In step 408, the receiver derandomizes the randomized MAP information using the seed value. Herein, the seed value is transferred from the base station to the mobile station through the signaling message in the network entry procedure.

As set forth above, by sending a separate seed value for a randomization and a CRC mask using one of a REG message, an HO message, and a RNG message, the base station can transmit the assignment A-MAP IE more safely.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operating method of a base station for transmitting MAP information in a wireless communication system, the method comprising:
   determining a seed value for randomizing MAP information bits;
   generating a Media Access Control (MAC) control message including the seed value and a Station IDentifier (STID); and
   transmitting the MAC control message to a mobile station,
   wherein the STID is used as a Cyclic Redundancy Check (CRC) mask making code.

2. The method of claim 1, wherein the MAC control message is one of an Advanced Air Interface (AAI)-RaNGing (RNG)-ReSPonse (RSP) message sent from the base station in response to an AAI-RNG-REQuest (REQ) message received from the mobile station in a network entry, an AAI-REGistration (REG)-RSP message sent from the base station in response to an AAI-REG-REQ message received from the mobile station to register the mobile station by negotiating general Advanced Mobile Station (AMS) capabilities in the network entry, and an AAI-HandOver (HO)-CoMmanD (CMD) message sent from the base station to initiate a handover procedure or in response to an AAI-HO-REQ message received from the mobile station.

3. The method of claim 1, wherein, when the STID is used as a Cyclic Redundancy Check (CRC) mask masking code, the seed value is used to initiate a Pseudo-Random Binary Sequence (PRBS) generator which is used to scramble the MAP information bits.

4. The method of claim 1, further comprising:
   generating a sequence of bits using the seed value and randomizing the MAP information bits by performing an XOR operation on the generated sequence and the MAP information bits;
   masking a 16-bit CRC using the CRC mask masking code;
   adding the masked 16-bit CRC to the randomized MAP information bits; and
   transmitting the randomized MAP information including the masked CRC.

5. The method of claim 1, wherein the CRC mask masking code comprises a 1-bit masking prefix and a 15-bit Least Significant Bit (LSB) remainder,
   wherein, when the masking prefix is 0, the 15-bit LSB remainder includes a 3-bit type indicator and a 12-bit masking code, and
   wherein, when the masking prefix is 1, the 15-bit LSB remainder includes a Random Access ID (RAID).

6. The method of claim 1, wherein the seed value is a time-varying value that is altered from an initial value after a predetermined amount of time.

7. The method of claim 6, wherein the base station and the mobile station synchronized to a shared time-varying function that alters the seed value after the predetermined amount of time.

8. The method of claim 1, wherein, when the STID is not the CRC mask masking code, then the initial vector of a Pseudo-Random Binary Sequence (PRBS) generator is the same as the CRC mask masking code excluding a 1-bit masking prefix.

9. An operating method of a mobile station for receiving MAP information in a wireless communication system, the method comprising:
   receiving from a base station a Media Access Control (MAC) control message including a seed value for randomizing MAP information bits and a Station IDentifier (STID) in a network entry procedure;
   extracting the seed value and the STID from the MAC control message; and
   decoding the MAP information bits using the seed value and the STID,
   wherein the STID is used as a Cyclic Redundancy Check (CRC) mask masking code.

10. The method of claim 9, wherein the MAC control message is one of an Advanced Air Interface (AAI)-RaNGing (RNG)-ReSPonse (RSP) message sent from the base station in response to an AAI-RNG-REQuest (REQ) message received from the mobile station in a network entry, an AAI-REGistration (REG)-RSP message sent from the base station in response to an AAI-REG-REQ message received from the mobile station to register the mobile station by negotiating general Advanced Mobile Station (AMS) capabilities in the network entry, and an AAI-HandOver (HO)-CoMmanD (CMD) message sent from the base station to initiate a handover procedure or in response to an AAI-HO-REQ message received from the mobile station.

11. The method of claim 9, wherein, when the STID is used as a Cyclic Redundancy Check (CRC) mask masking code, the seed value is used to initiate a Pseudo-Random Binary Sequence (PRBS) generator which is used to scramble the MAP information bits.

12. The method of claim 9, wherein the decoding of the MAP information bits using the seed value and the STID comprises:
   restoring a masked CRC in the MAP information bits, using the CRC mask masking code;
   verifying a CRC using the restored CRC;

generating a sequence of bits using the seed value for the randomization after the verifying of the CRC; and derandomizing the MAP information bits by performing an XOR operation on the generated sequence and the randomized MAP information bits.

13. The method of claim 9, wherein the CRC mask masking code includes a 1-bit masking prefix and a 15-bit Least Significant Bit (LSB) remainder, wherein, when the masking prefix is 0, the 15-bit LSB remainder comprises a 3-bit type indicator and a 12-bit masking code, and wherein, when the masking prefix is 1, the 15-bit LSB remainder uses a Random Access ID (RAID).

14. The method of claim 9, wherein, when the STID is not the CRC mask masking code, then the initial vector of a Pseudo-Random Binary Sequence (PRBS) generator is the same as the CRC mask masking code excluding a 1-bit masking prefix.

15. An apparatus of a base station for transmitting MAP information in a wireless communication system, the apparatus comprising:

a controller for determining a seed value for randomizing MAP information bits, and generating a Media Access Control (MAC) control message including the seed value and a Station IDentifier (STID); and a transmitter for transmitting the MAC control message to a mobile station, wherein the STID is used as a Cyclic Redundancy Check (CRC) mask masking code.

16. The apparatus of claim 15, wherein the MAC control message is one of an Advanced Air Interface (AAI)-RaNGing (RNG)-ReSPonse (RSP) message sent from the base station in response to an AAI-RNG-REQuest (REQ) message received from the mobile station in a network entry, an AAI-REGistration (REG)-RSP message sent from the base station in response to an AAI-REG-REQ message received from the mobile station to register the mobile station by negotiating general Advanced Mobile Station (AMS) capabilities in the network entry, and an AAI-HandOver (HO)-CoMmanD (CMD) message sent from the base station to initiate a handover procedure or in response to an AAI-HO-REQ message received from the mobile station.

17. The apparatus of claim 15, wherein, when the STID is used as a Cyclic Redundancy Check (CRC) mask masking code, the seed value is used to initiate a Pseudo-Random Binary Sequence (PRBS) generator which is used to scramble the MAP information bits.

18. The apparatus of claim 15, further comprising:

a randomizer for generating a sequence of bits using the seed value and randomizing the MAP information bits by performing an XOR operation on the generated sequence and the MAP information bits;

a CRC mask for masking a 16-bit CRC using the CRC mask masking code;

a CRC inserter for adding the masked 16-bit CRC to the randomized MAP information bits;

a channel encoder for encoding the randomized MAP information including the masked CRC; and a modulator for modulating the channel-encoded MAP information.

19. The apparatus of claim 15, wherein the CRC mask masking code comprises a 1-bit masking prefix and a 15-bit Least Significant Bit (LBS), and when the masking prefix is 0, the LBS 15 bits comprise a 3-bit type indicator and a 12-bit masking code, and when the masking prefix is 1, the LBS 15 bits use a Random Access ID (RAID).

20. The apparatus of claim 15, wherein, when the STID is not the CRC mask masking code, then the initial vector of a Pseudo-Random Binary Sequence (PRBS) generator is the same as the CRC mask masking code excluding a 1-bit masking prefix.

21. An apparatus of a mobile station for receiving MAP information in a wireless communication system, the apparatus comprising:

a receiver for receiving a Radio Frequency (RF) signal from a base station, the RF signal including a Media Access Control (MAC) control message including a seed value for randomizing MAP information bits and a Station IDentifier (STID) in a network entry procedure; and a decoder for extracting the seed value and the STID from the MAC control message, and for decoding the MAP information bits based on the seed value and the STID, wherein the STID is used as a Cyclic Redundancy Check (CRC) mask masking code.

22. The apparatus of claim 21, wherein the MAC control message is one of an Advanced Air Interface (AAI)-RaNGing (RNG)-ReSPonse (RSP) message sent from the base station in response to an AAI-RNG-REQuest (REQ) message received from the mobile station in a network entry, an AAI-REGistration (REG)-RSP message sent from the base station in response to an AAI-REG-REQ message received from the mobile station to register the mobile station by negotiating general Advanced Mobile Station (AMS) capabilities in the network entry, and an AAI-HandOver (HO)-CoMmanD (CMD) message sent from the base station to initiate a handover procedure or in response to an AAI-HO-REQ message received from the mobile station.

23. The apparatus of claim 21, wherein, when the STID is used as a Cyclic Redundancy Check (CRC) mask masking code, the seed value is used to initiate a Pseudo-Random Binary Sequence (PRBS) generator which is used to scramble the MAP information bits.

24. The apparatus of claim 21, wherein the decoder restores the masked CRC in the MAP information bits, using the CRC mask masking code, and further comprising:

a CRC checker for checking CRC using the restored CRC; and a derandomizer for generating a sequence of bits using the seed value for the randomization and derandomizing the MAP information bits by performing an XOR operation on the generated sequence and the randomized MAP information bits.

25. The apparatus of claim 21, wherein the CRC mask masking code comprises a 1-bit masking prefix and a 15-bit Least Significant Bit (LSB) remainder, wherein, when the masking prefix is 0, the 15-bit LSB remainder includes a 3-bit type indicator and a 12-bit masking code, and wherein, when the masking prefix is 1, the 15-bit LSB remainder uses a Random Access ID (RAID).

26. The apparatus of claim 21, wherein, when the STID is not the CRC mask masking code, then the initial vector of a Pseudo-Random Binary Sequence (PRBS) generator is the same as the CRC mask masking code excluding a 1-bit masking prefix.

* * * * *